(12) United States Patent
Kubota et al.

(10) Patent No.: US 8,363,179 B2
(45) Date of Patent: Jan. 29, 2013

(54) LIQUID CRYSTAL DISPLAY DEVICE

(75) Inventors: Hidenao Kubota, Yokohama (JP);
Kazuhiro Kaizaki, Yokohama (JP);
Shigeyuki Sasaki, Kasumigaura (JP);
Takeshi Mochizuki, Yokohama (JP);
Toshihiro Tsutsui, Inagi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 162 days.

(21) Appl. No.: 12/912,866

(22) Filed: Oct. 27, 2010

(65) Prior Publication Data

US 2011/0234939 A1 Sep. 29, 2011

(30) Foreign Application Priority Data

Mar. 26, 2010 (JP) ................................. 2010-072658

(51) Int. Cl.
*G02F 1/1333* (2006.01)
(52) U.S. Cl. .......................................... 349/58
(58) Field of Classification Search ..................... 349/58, 349/65

See application file for complete search history.

(56) References Cited

U.S. PATENT DOCUMENTS

| | | | | |
|---|---|---|---|---|
| 7,553,055 | B2 * | 6/2009 | Liu | 362/600 |
| 2007/0133221 | A1 | 6/2007 | Liu | |
| 2007/0284597 | A1 * | 12/2007 | Nawashiro et al. | 257/89 |
| 2009/0303410 | A1 | 12/2009 | Murata et al. | |

FOREIGN PATENT DOCUMENTS

| | | |
|---|---|---|
| JP | 2006-011239 A | 1/2006 |
| JP | 2006-235399 A | 9/2006 |
| JP | 2007-156490 A | 6/2007 |
| JP | 2010-21131 A | 1/2010 |

* cited by examiner

*Primary Examiner* — James Dudek
(74) *Attorney, Agent, or Firm* — Miles and Stockbridge P.C.

(57) ABSTRACT

A liquid crystal display device with improved thermal exhaustion property, enabling a thickness reduction, includes a backlight including light sources illuminating a liquid crystal panel from a back face, and a chassis holding the backlight. The backlight includes: plural light-source units each including a combination of a LED emitting light in a direction parallel to a display surface of the panel, a wiring board mounted with the LED, and a light-guide plate having translucency for guiding the LED light toward the panel; a metal chassis supporting the light-source units; and a thermally conductive sheet tightly inserted between the metal chassis and a reverse side of the wiring board opposite to the LED-mounted face. A wiring pattern is formed on the reverse side. The metal chassis and the wiring pattern located within a predetermined distance of the LED outer periphery are connected through the thermally conductive sheet.

9 Claims, 11 Drawing Sheets

VIEWPOINT C

LIQUID CRYSTAL DISPLAY DEVICE

CLAIM OF PRIORITY

The present application claims priority from Japanese patent application JP 2010-072658 filed on Mar. 26, 2010, the content of which is hereby incorporated by reference into this application.

BACKGROUND OF THE INVENTION (1) Field of the Invention

This invention relates to a liquid crystal display device and, more particularly, to a liquid crystal display device which is capable of efficiently exhausting heat produced inside a chassis.
Rejection Heat (2) Description of the Related Art Recent years, emissive-type plasma display devices and non-emissive-type liquid crystal display devices, which replace CRTs (Cathode Ray Tubes), have been increasingly used as a display device.

Of them, the liquid crystal displays employ a liquid crystal panel as a transmissive-type optical modulation device, in which a lighting device (hereinafter referred to as "backlight") is provided on the back surface to apply light to the liquid crystal panel. Then, the liquid crystal panel generates an image by controlling the transmittance of the light emitted from the backlight.

The following two types of backlight for applying light to the liquid crystal panel are known.

One of them is an edge-lit type backlight which includes light sources disposed on the right and left edges or the top and bottom edges of the liquid crystal panel and emitting light to a light guide plate for redirecting the light toward the planar direction for illumination. The other is a direct-lit type backlight which applies light from the back surface of the liquid crystal panel.

One of the features of the liquid crystal display devices provides a reduction of the thickness of the outside shape, but a thinner and lower power liquid crystal display device has been desired in recent years. A reduction in thickness of the liquid crystal display device makes it difficult to ensure an airflow path for exhausting heat produced in a chassis which defining the outside shape of the liquid crystal display device. As a result, the heat cannot be efficiently exhausted, giving rise to a temperature rise in a heat-sensitive area.

To avoid this, for example, JP-A-No. 2006-235399 discloses an edge-lit liquid crystal display device in which LEDs (Light Emitting Diodes) are used as light sources of the backlight and a light-source mounting board (LED mounting board) is connected to a thermally conductive member for removing the heat produced by the LEDs for heat exhaustion from the both surfaces of the light-source mounting board.

SUMMARY OF THE INVENTION

In the edge-lit type of the types of the backlight for illuminating the liquid crystal panel, since the light sources are concentratedly disposed on edges of the screen, the heat from the light sources is not easily cooled or exhausted as compared with the direct-lit type.

On the other hand, the direct-lit type backlight uses a larger number of light sources than those in the edge-lit type backlight, thus increasing the cost and the power consumption. Also, the direct-lit type backlight requires an adequate distance between the light sources and the liquid crystal panel (that is, the distance in the thickness direction of the liquid crystal panel) in order to improve luminance uniformity in an image displayed on the liquid crystal panel, which is at a disadvantage in a reduction in thickness of the liquid crystal display device. In addition, putting a distance between the light sources and the liquid crystal panel gives rise to a disadvantage that it is difficult to control the light sources to provide a high contrast ratio is made difficult.

The present invention has been made in view of the above circumstances and provides techniques suitable for improving thermal exhaustion property and image quality in a liquid crystal display device which employs, for example, plural LEDs as light sources.

For dissolving the drawbacks mentioned above, the present invention provides a liquid crystal display device including a backlight including light sources illuminating a liquid crystal panel from a rear side thereof, and a chassis holding the backlight. The backlight includes a plurality of light-source units each including a combination of a LED that emits light in a direction parallel to a display surface of the liquid crystal panel, a wiring board mounted with the LED, and a light-guide plate having translucency for guiding the light of the LED toward the liquid crystal panel. The backlight also includes a metal chassis supporting the light-source units, and a thermally conductive sheet making close contact with and inserted between the metal chassis and a reverse side of the wiring board which is opposite to a face on which the LED is mounted. A wiring pattern is formed on the reverse side of the wiring board, and the metal chassis and the wiring pattern located within a predetermined distance of the outer periphery of the LED are connected through the thermally conductive sheet to each other.

Preferably, the wiring board has a board material substrate, wiring patterns respectively formed on both sides of the board material substrate, a resist for electrically insulating a predetermined area of the wiring patterns, and a through hole for electrically connecting the wiring patterns on both sides to each other.

Preferably, the predetermined distance is 20 mm or less.

Preferably, solder is accumulated on the wiring pattern on the reverse side, and the wiring board is attached closely to the metal chassis through a portion where the solder is accumulated and the thermally conductive sheet.

Preferably, a connector is placed on the reverse side of the wiring board for connection to another circuit board.

More preferably, the wiring boards are arranged in a plurality of rows or a plurality of columns in at least one of the horizontal direction and the vertical direction with respect to the display surface of the liquid crystal panel.

According to the present invention, it is possible to provide a liquid crystal display device with improved thermal exhaustion property while enabling a reduction in thickness of the liquid crystal display device.

BRIEF DESCRIPTION OF THE DRAWINGS

Embodiments of the present invention will be described based on the following drawings, wherein.

DETAILED DESCRIPTION OF THE INVENTION

An embodiment according to the present invention will be described below in detail with reference to the drawings as appropriate.

Figure 1:
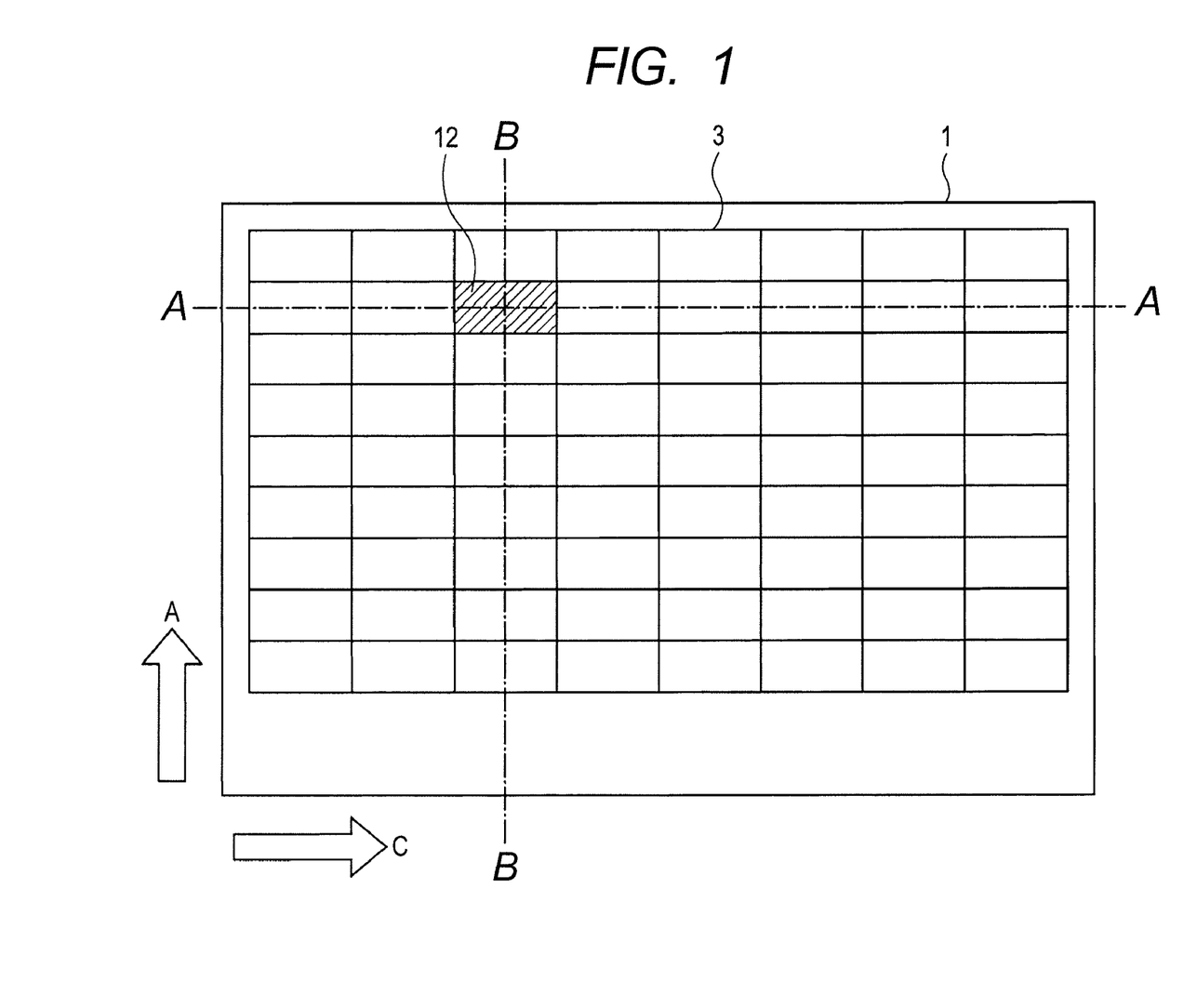
FIG. 1 is a view illustrating a liquid crystal display device according to an example of an embodiment of the present invention when the inside is viewed from the front.
Figure 2A:
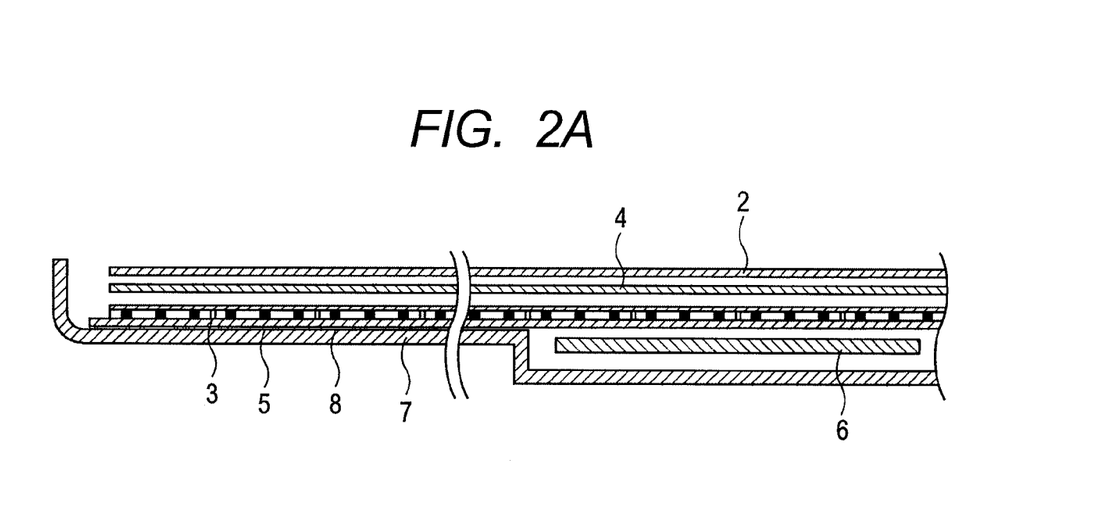
FIG. 2A is a sectional view taken along A-A line in FIG. 1.
Figure 2B:
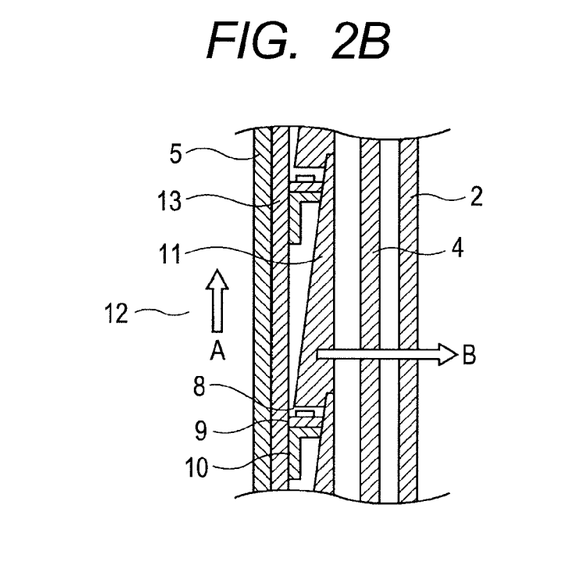
FIG. 2B is a sectional view taken along B-B line in FIG. 1.

FIGS. 1, 2A and 2B show an example of liquid crystal display devices to which the embodiment according to the present invention applies.

FIG. 1 is a front view illustrating the inside of the liquid crystal display device 1 according to a first embodiment of the present invention.

FIG. 2A is a partially enlarged view of cross-section A-A in FIG. 1.

FIG. 2B is a partially enlarged view of cross-section B-B in FIG. 1.

As illustrated in FIG. 2A, the liquid crystal display device of the example includes a liquid crystal panel 2 as a passive display device, a backlight unit 3 for illuminating the liquid crystal panel 2, and an optical sheet 4 which is sandwiched between the liquid crystal panel 2 and the backlight unit 3 for diffusing the light of the backlight unit 3. The liquid crystal panel 2 may a liquid crystal panel with a color filter, a monochrome liquid crystal panel or an IPS or VA liquid crystal panel. The backlight unit 3 is installed into a box-shaped chassis 5 which, for example, is formed of a metal plate such as an aluminum plate, a steel plate or the like. A circuit board 6 containing a signal control circuit, a power-source circuit, a panel drive circuit and the like is mounted on the back surface of the chassis 5. The liquid crystal display device includes a back cover 7 for housing the above-described elements, and the like. FIG. 2A schematically shows one optical sheet 4, but it is actually made up of any combination of a diffuser sheet, a prism sheet, a diffuser plate, a polarization-selective reflection film, and the like. Since these films reflects a portion of the light emitted from the light source 8, toward the backlight unit 3, the light again reflected off the backlight unit 3 transmits and diffuses. Hence, the films have the effect of improving luminance uniformity.

As shown in FIG. 1, the backlight unit 3 is divided into light guide plate blocks 20 arranged in plural rows (in the horizontal direction, or the C direction) and plural columns (in the vertical direction, or the A direction) (nine rows and eight columns in the example in FIG. 1).

As shown in FIG. 2B, the backlight unit 3 includes light-source units 12 each including a combination of a wiring board 9 having mounted thereon LEDs (Light Emitting Diodes) as light sources, an L-shaped heat sink 10 placed on the wiring board 9 and formed of thermal conductive materials such as aluminum and/or the like, a light-guide plate 11 for receiving light emitted from the light source 8 in the direction of arrow A (i.e., the direction parallel to the liquid crystal panel 2), then redirecting the incident light toward the direction of arrow B (i.e., the direction perpendicular to the display surface of the liquid crystal panel 2) to guide it toward the liquid crystal panel 2 which is disposed in front of the backlight unit 3 and emits the light in a planar form. The plural light-source units 12 are arranged in the direction of arrow A and the direction of arrow C as shown in FIG. 1, in other words, in the direction parallel to the display surface of the liquid crystal panel 2.

Alternatively, for example, if the light-source units 12 are arranged in eight columns in the A direction and 16 rows in the C direction, the display area of the liquid crystal panel 2 may be divided into 128 subareas respectively corresponding to the light-source units 12, so that the brightness, color and the like may be controlled on a subarea-by-subarea basis. It should be understood that the number of light-source units 12 (the number of divisions of the display area) is not limited to 128. The larger the number of light-source units 12, the more the detailed control can be achieved. However, too much light-source units 12 leads to a significant increase in component count and cost. For this reason, a proper number of light-source units 12 may be desirably determined in accordance with a size of the liquid crystal panel 2.

As shown in FIG. 2B, for installing the light-source unit 12 into the chassis 5, one or plural light-source unit 12 may be previously secured to a sub-chassis 13 made of a thermal conductive material such as aluminum and/or the like, and then the sub-chassis 13 mounted with the light-source unit 12 may be attached to the chassis 5. This makes it possible to improve the assembly property. Dividing the backlight unit 3 into an array of light-source units 12 makes the light-source unit 12 sharable even among screens of different sizes, thus achieving screen-size development at low cost.

The light-source unit according to the example will be described below in detail with reference to FIG. 3.

Figure 3:
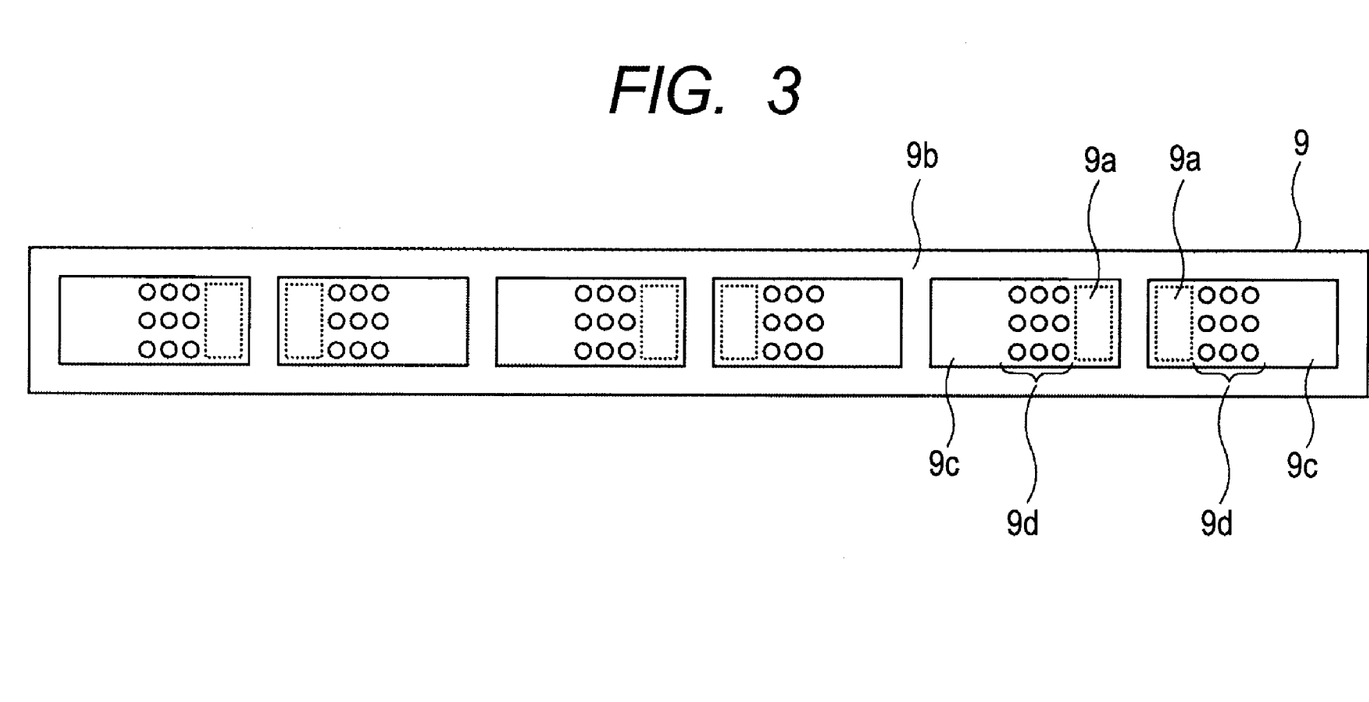
FIG. 3 is a diagram illustrating components of a wiring board used in the example.

FIG. 3 illustrates a wiring board 9 on which LEDs (Light Emitting Diodes) as the light sources 8 is to be placed.

FIG. 3 shows the wiring board 9 before the LEDs are placed, and the LEDs 8 will be connected to a wiring pad 9a formed in conformity with an electrode of the LED by the use of solder. The wiring board 9 includes a LED mounting surface 9b and wiring patterns 9c formed by the use of, for example, copper and provided for feeding power to the LEDs 8 on the reverse side. Each of the wiring patterns 9c on the front side and the corresponding wiring pattern (not shown) on the reverse side are electrically and thermally connected through plural through-holes 9d to each other. Heat generated by the LED 8 is diffused in the planar direction by the wiring pattern 9c on the front side and thermally conducted through the through-holes 9d to the reverse side, and then is diffused in the planar direction by the wiring pattern on the reverse side.

After being thermally diffused on the front and reverse sides, the heat is conducted to the heat sink 10 and the sub-chassis 13 which are shown in FIG. 2B, as described later. Since the entire reverse side of the wiring board is connected to the heat sink 10, the through-holes 9d are desirably located as close to the wiring pad 9a on which the LED 8 is mounted as possible such that the heat of the LED 8 is conducted to the reverse side at a minimum distance.

In regard to the LEDs 8, plural sets of, for example, three red, green and blue light emitting devices or of, for example cyan, magenta and yellow light emitting devices rather than the red, green and blue colors may be provided. In the case of using light emitting devices of plural colors, an optical component may be provided in the light source 8 for mixing the color lights emitted from different color light emitting devices. In another possible structure, plural light emitting devices of one color (for example, white color) may be provided.

In the backlight unit 3 shown in FIGS. 2A, 2B, top-view type LEDs are mounted. However, a side-view type can be considered as another LED mounting structure, in which, in backlight using LEDs as light sources and allowing the light to propagate to a light guide plate for the planar output of light, the same pattern as that on the wiring board 9 in FIG. 3 is used and the wiring board is installed directly in the chassis 5 without interposition of the heat sink 10. In this case, as compared with the top-view type, since the heat sink 10 is not necessary, the number of components can be reduced, and also there is a feature of smooth heat conduction through the chassis 5 to the rear.

Figure 9:
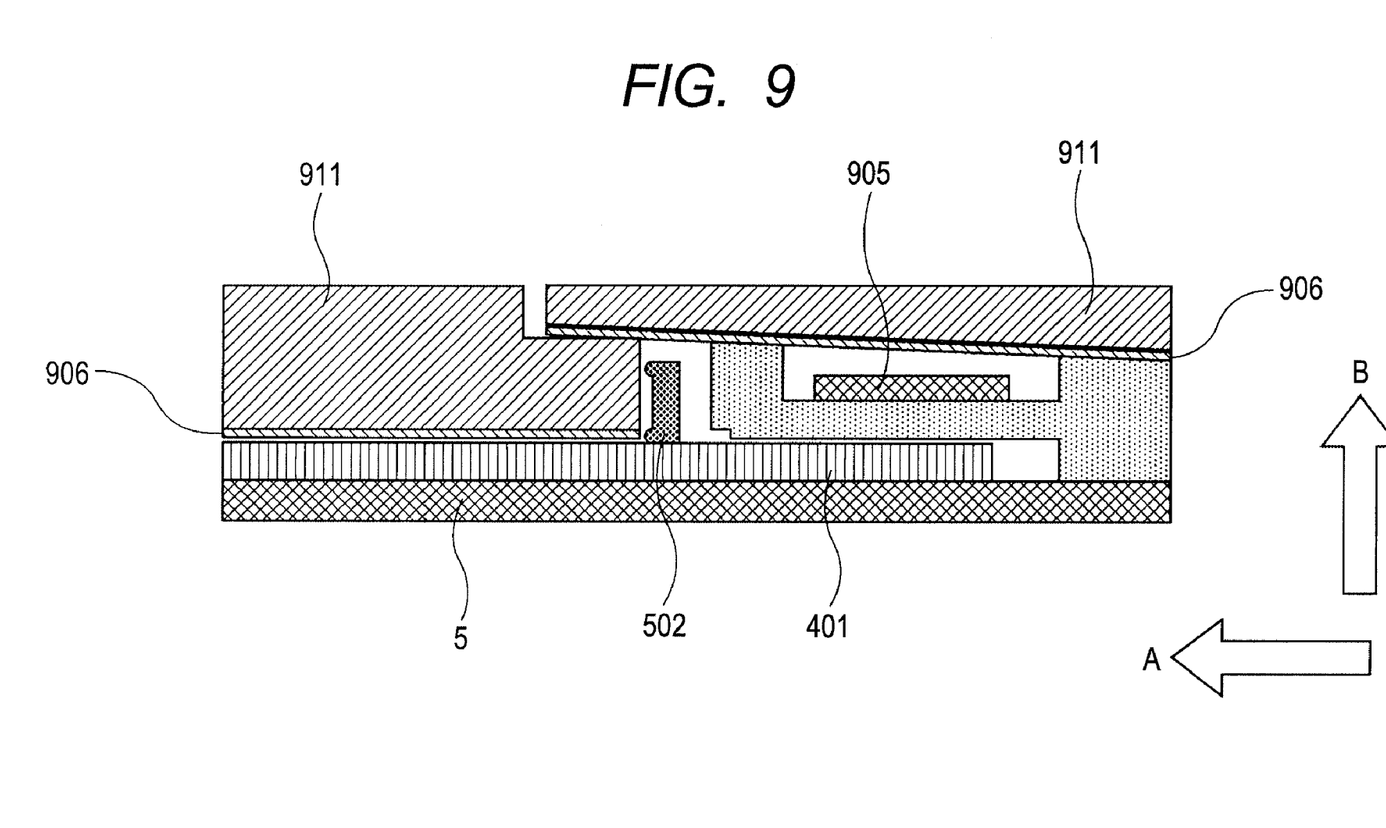
FIG. 9 is a partially enlarged view of B-B cross-section in FIG. 1 when a side-view type LED is used.

FIG. 9 is a partially enlarged view of cross-section B-B in FIG. 1 when a side-view type LED is used as a light source.

As shown in FIG. 9, the side-view type LED 502 is thermally, electrically and mechanically connected to a wiring board 401 with solder, an electrically-conductive adhesive or the like. The wiring board 401 is thermally and mechanically connected to the chassis 5 through a thermally conductive sheet, not shown, (see FIG. 6).

Next, the light-source unit according to the example illustrated in FIG. 9 will be described in detail with reference to FIG. 10.

Figure 10:
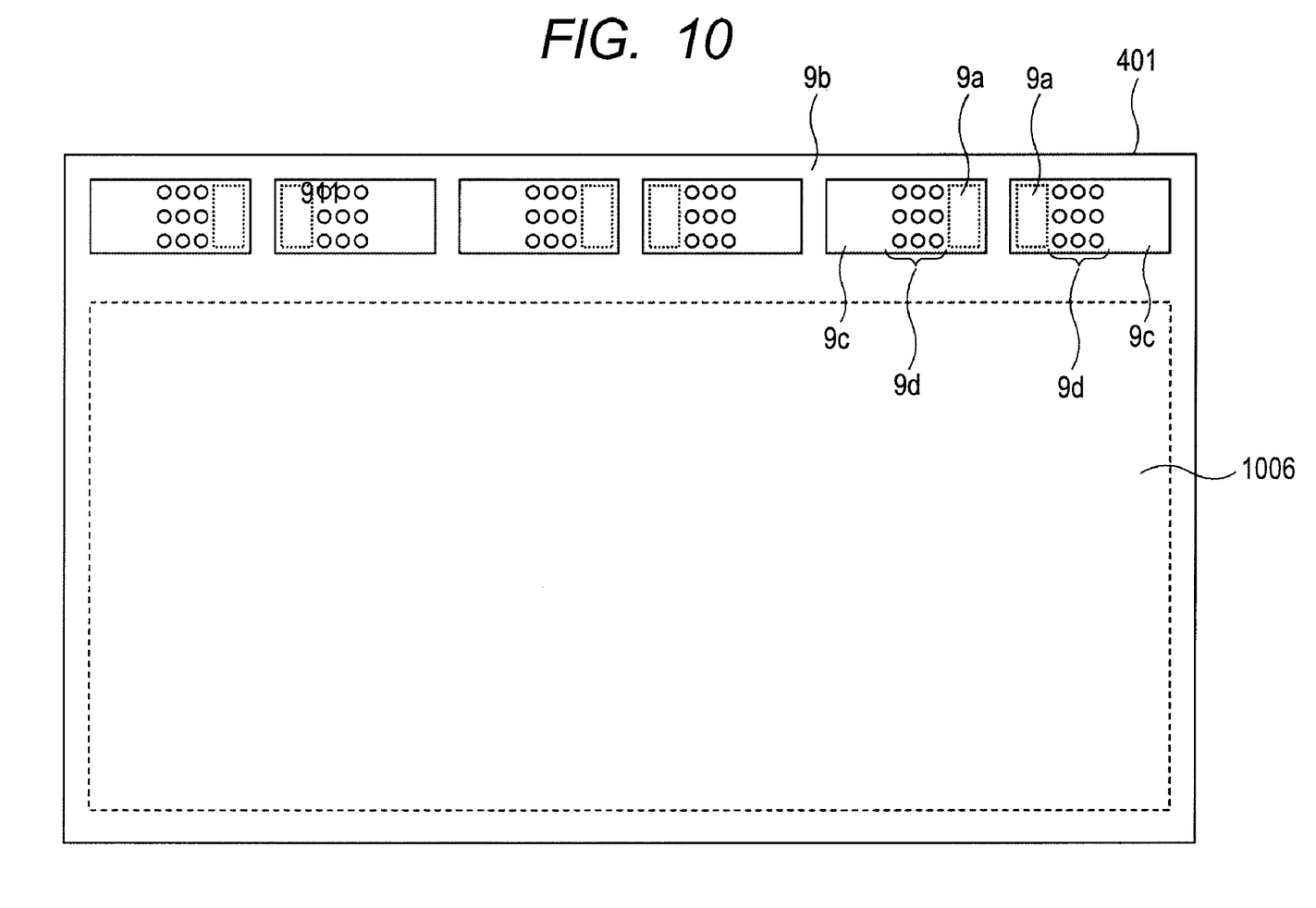
FIG. 10 is a diagram illustrating an example of the wiring board on which LEDs are mounted as light sources according to an embodiment of the present invention.

FIG. 10 shows the wiring board 401 on which the LEDs 502 are to be mounted as light sources.

FIG. 10 shows the wiring board 401 before the LEDs 502 are placed, and the LEDs 502 will be connected to wiring pads 9a formed in conformity with electrodes of the LEDs by the use of solder or an electrically-conductive adhesive. The wiring board 401 includes a LED mounting surface 9b and wiring patterns 9c formed of copper for feeding power to the LEDs 502 on the reverse side. Each of the wiring patterns 9c on the front side and the corresponding wiring pattern (not shown) on the reverse side are electrically and thermally connected through plural through-holes 9d to each other. Heat generated by the LED 502 is diffused in the planar direction through the wiring pattern 9c on the front side and thermally conducted through the through-holes 9d to the reverse side, and then is diffused in the planar direction by the wiring pattern (see FIG. 6) on the reverse side.

A resist is not provided on a predetermined area of the reverse side of the wiring board 401 underneath the LED 502. For this reason, the heat generated by the LED 502 propagates directly through the thermally conductive sheet 501 to the chassis 5. As a result, the thermal exhaustion property is enhanced, thus improving the cooling efficiency.

Figure 4A:
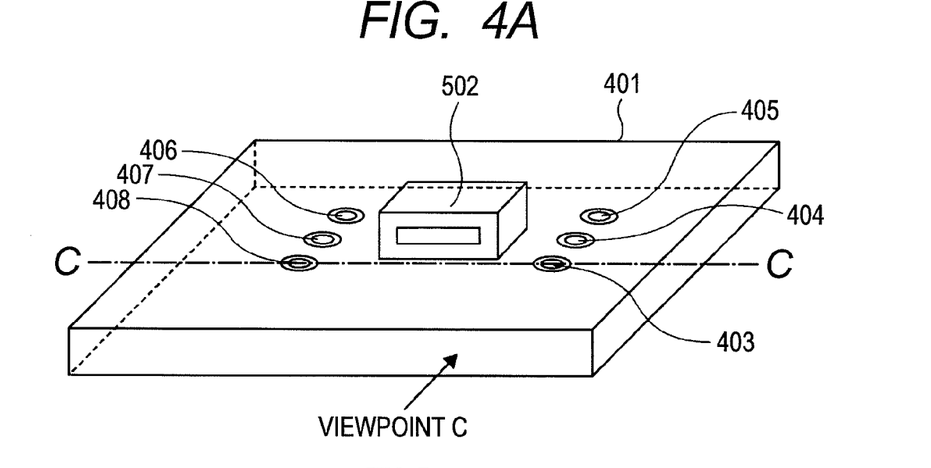
FIGS. 4A to 4C are diagrams illustrating an example of a side-view type LED placed on a LED board.
Figure 4B:
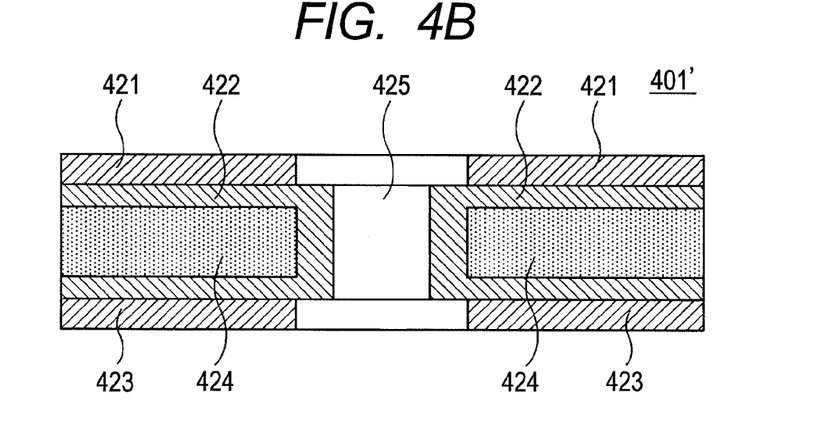
Figure 4C:
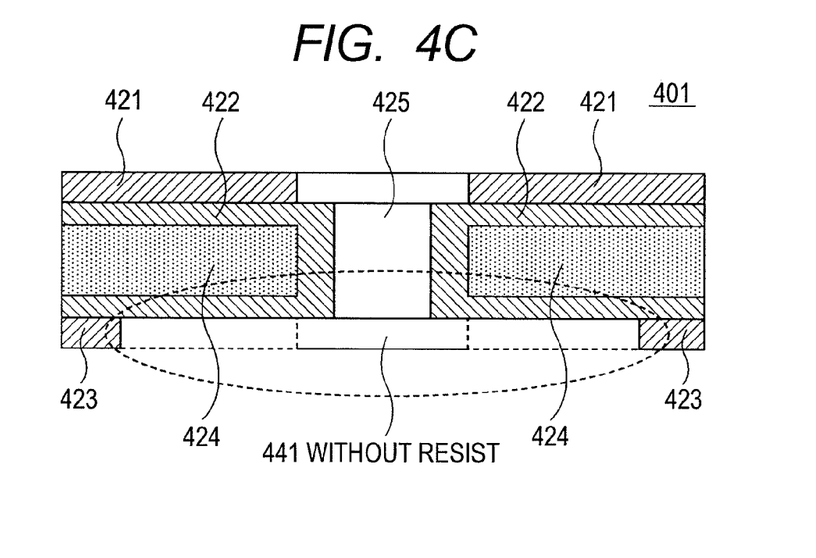
Figure 6:
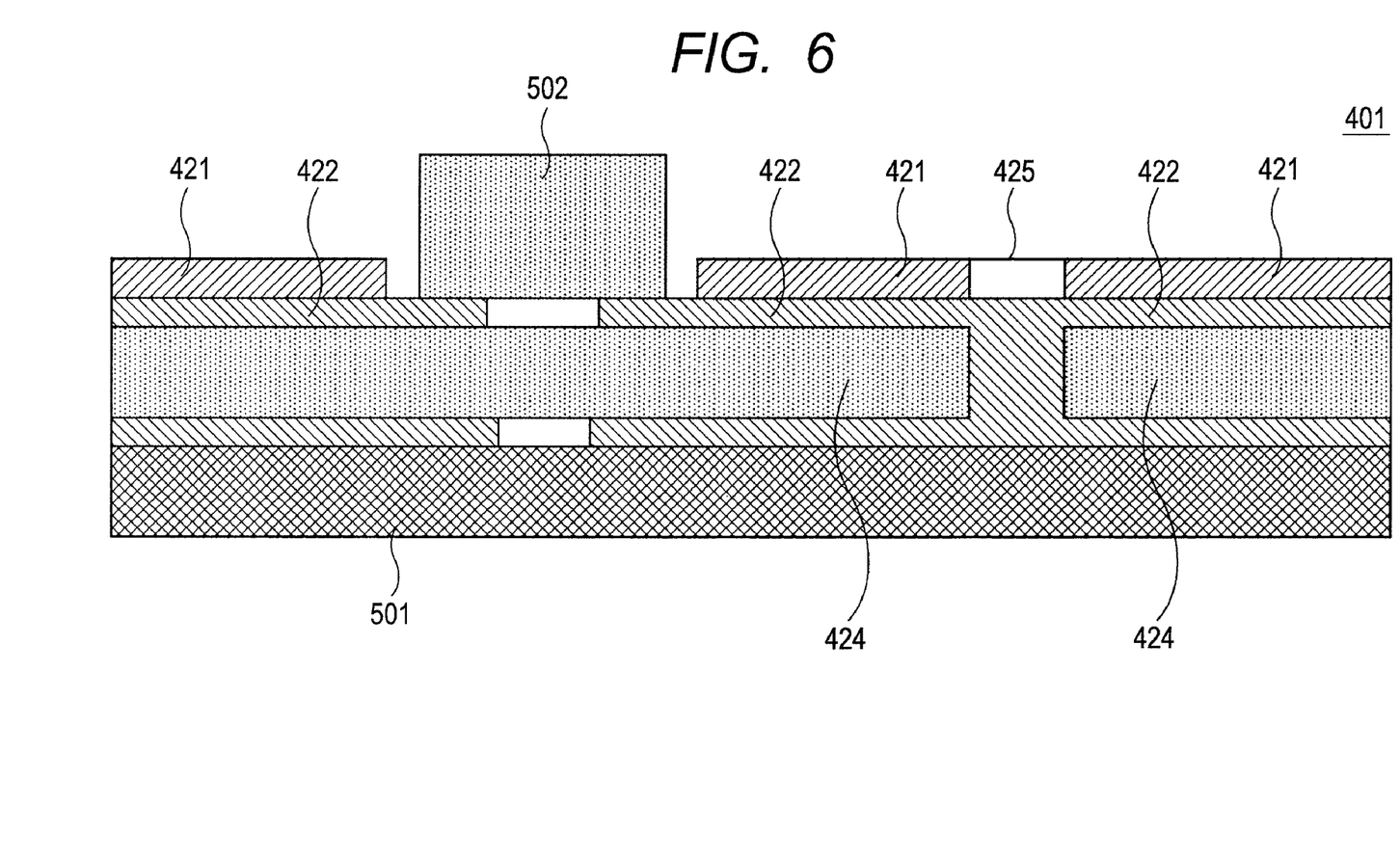
FIG. 6 is a sectional view showing a wiring board according to the embodiment of the present invention including a portion on which the LED is mounted.
Figure 11:
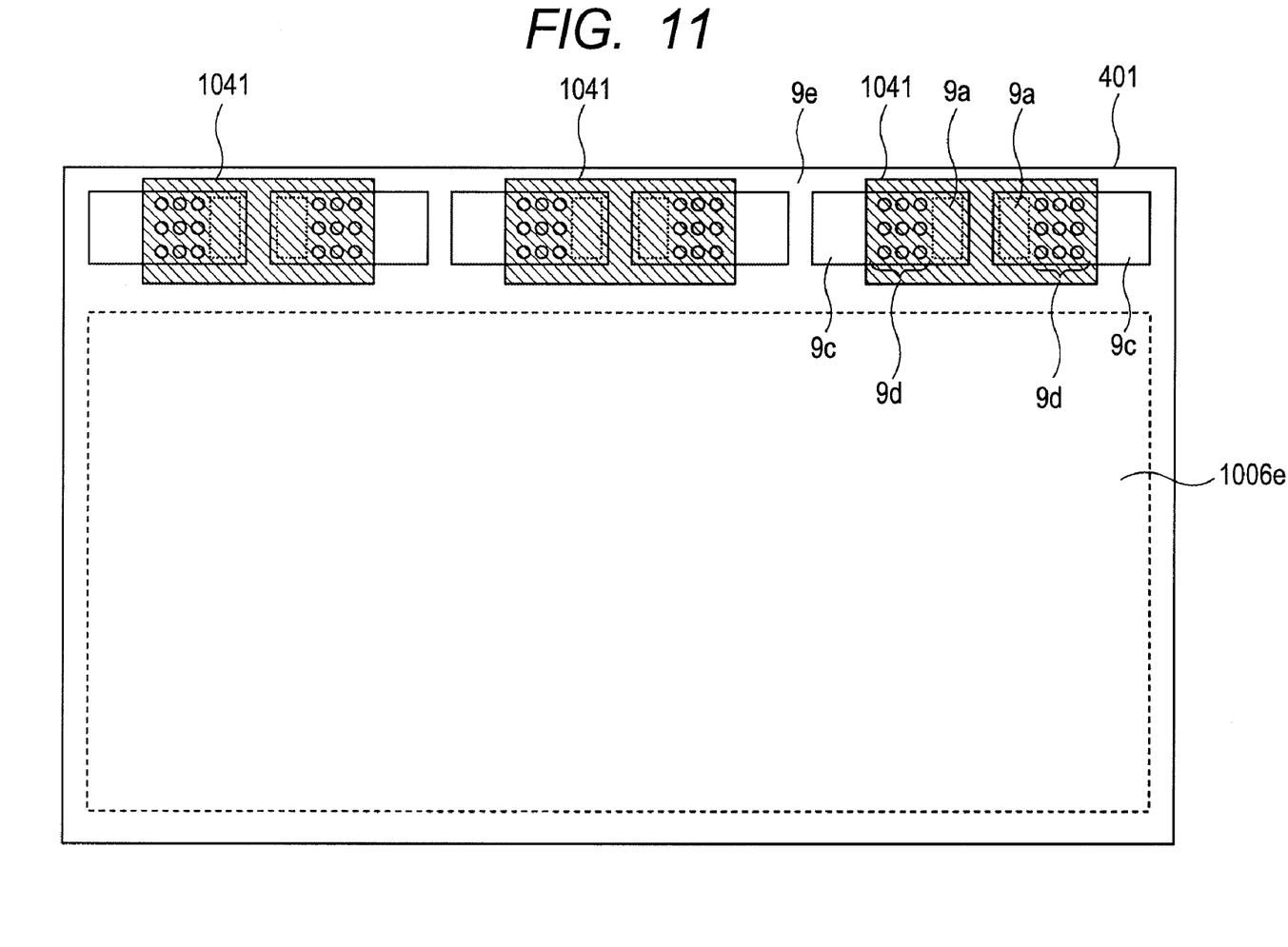
FIG. 11 is a diagram of an example of the wiring board according to an embodiment of the present invention when viewed from a reverse side opposite to the face on which the LEDs are mounted.

Preferably, solder is accumulated in the area without a resist in FIGS. 4C, 6, 11 and the like. This results in achievements of an increase in the adhering area of the thermally conductive sheet and the reverse side of the wiring board, and a reduction in thermal resistance.

Still preferably, the area without a resist is coated with an electrically-conductive adhesive or an electrically-conductive resin in FIGS. 4C, 6, 11 and the like. This results in achievements of an increase in the adhering area of the thermally conductive sheet and the reverse side of the wiring board, and a reduction in thermal resistance.

In regard to the LEDs 502, plural sets of, for example, three red, green and blue light emitting devices or of, for example cyan, magenta and yellow light emitting devices rather than the red, green and blue colors may be provided. In the case of using light emitting devices of plural colors, an optical component may be provided in the light source 8 for mixing the color lights emitted from different color light emitting devices. In another possible structure, plural light emitting devices of one color (for example, white color) may be provided.

Note that, in the case of the example illustrated in FIG. 10, components other than the LEDs 502 are mounted on a region 1006, but the components, wiring patterns, resists and the like are not shown. The boards 401 are preferably arranged in the horizontal direction (arrow C) and the vertical direction (arrow A) in the respective light emitting units 12 in FIG. 1.

FIG. 11 is a diagram illustrating an example of the wiring board 401 when viewed from the reverse side opposite to the LED mounting surface 9b. A diagonally shaded region 1041 indicates that there is no resist (see FIG. 4C or FIG. 6) in a range within a predetermined distance from the reverse side 9e of the wiring pad 9a corresponding to a heat-producing area of the LED electrode pad of the LED 502. A resist is applied to the remaining area of the reverse side 9e including the region 1006e other than necessary points. There is preferably no component mounted on the region 1006e, except for a connector mounted for connection to another circuit board.

In the example shown in FIG. 11, the non-resist region is rectangular. However, the shape of the non-resist region may be arbitrarily determined and the distance from the LED may be freely designed according to circumstances.

More preferably, the non-resist region is located within 20 mm of the outer periphery of the LED.

FIGS. 4A, 4B and 4C are diagrams illustrating examples that a side-view type LED is mounted on a LED mounting board (wiring board). FIG. 4A is a perspective view of a LED mounting surface, and FIGS. 4B and 4C are C-C sectional views when an area around a through-hole 403 in FIG. 4A is viewed from viewpoint C. FIG. 4C is a sectional view of an example according to the embodiment of the present invention. FIG. 4B is a sectional view for reference.

Reference numerals 401 and 401' denote wiring boards, which show part of the wiring board 9 shown in FIG. 3. Reference numeral 502 denotes a side-view type LED, 403 to 408 through-holes, 421 a resist, 422 a copper wiring pattern forming the wiring pattern, 423 a resist, 424 a board material substrate of the wiring board, 425 a through-hole, and reference numeral 441 denotes a non-resist region. The board material substrate 424 is formed of, for example, a glass epoxy resin.

As shown in FIG. 4B for reference, in general, the resist applied to an area around the through-hole 25 on the reverse side of the wiring board 401 (the surface opposite to the mounting surface on which the LED 502 is mounted) has approximately the same area as the area of the resist applied to the mounting surface. However, in the example, as shown in FIG. 4C, the wiring board 401 is designed to has no resist applied to a predetermined range around the through-hole 425 on the reverse side.

For example, in FIG. 4C, the copper wiring pattern 422 has a thickness ranging from 35 $\mu$m to 100 $\mu$m or from 90 $\mu$m to 100 $\mu$m. The resist 421, 423 has a thickness ranging from 37 $\mu$m to 80 $\mu$m. The board material substrate 424 has a thickness ranging from 1000 $\mu$m to 1600 $\mu$m.

Figure 5:
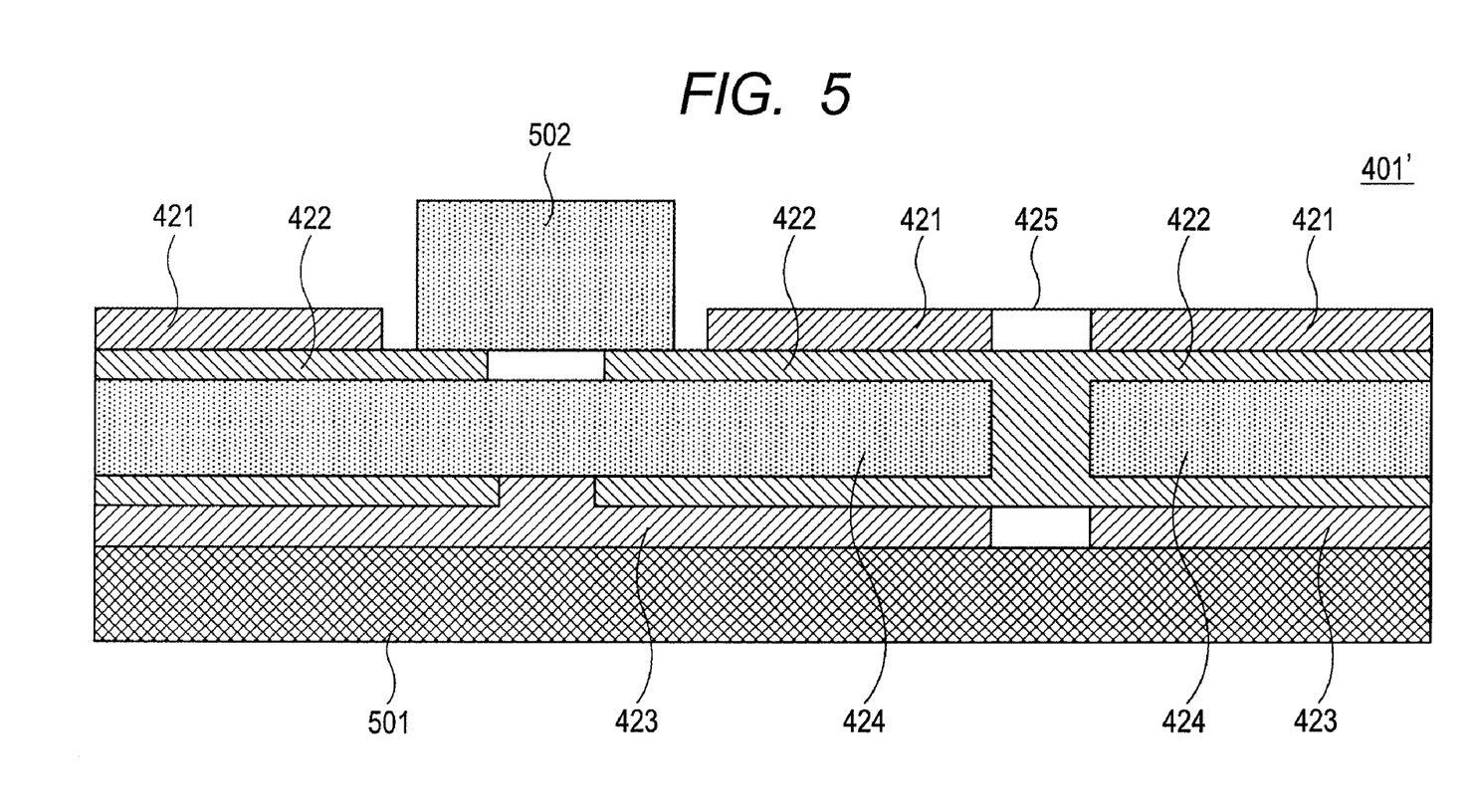
FIG. 5 is a sectional view showing a wiring board for reference including a portion on which the LED is mounted.
Figure 7:
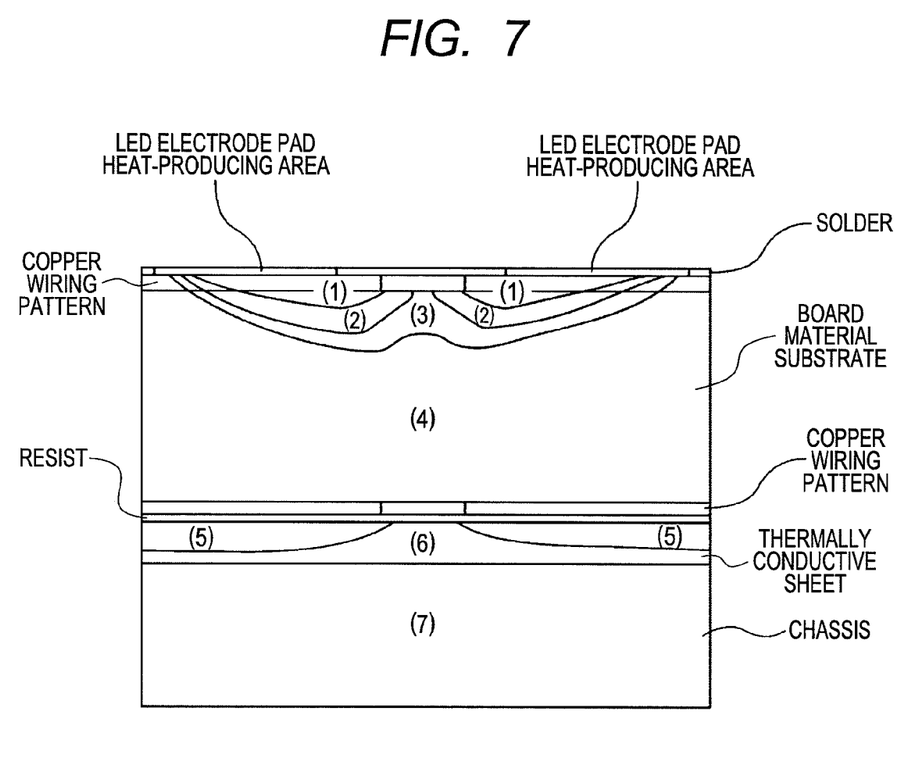
FIG. 7 is a diagram illustrating result of temperature analysis on configuration in an example of the wiring board used in the liquid crystal display panel according to an embodiment of the present invention.
Figure 8:
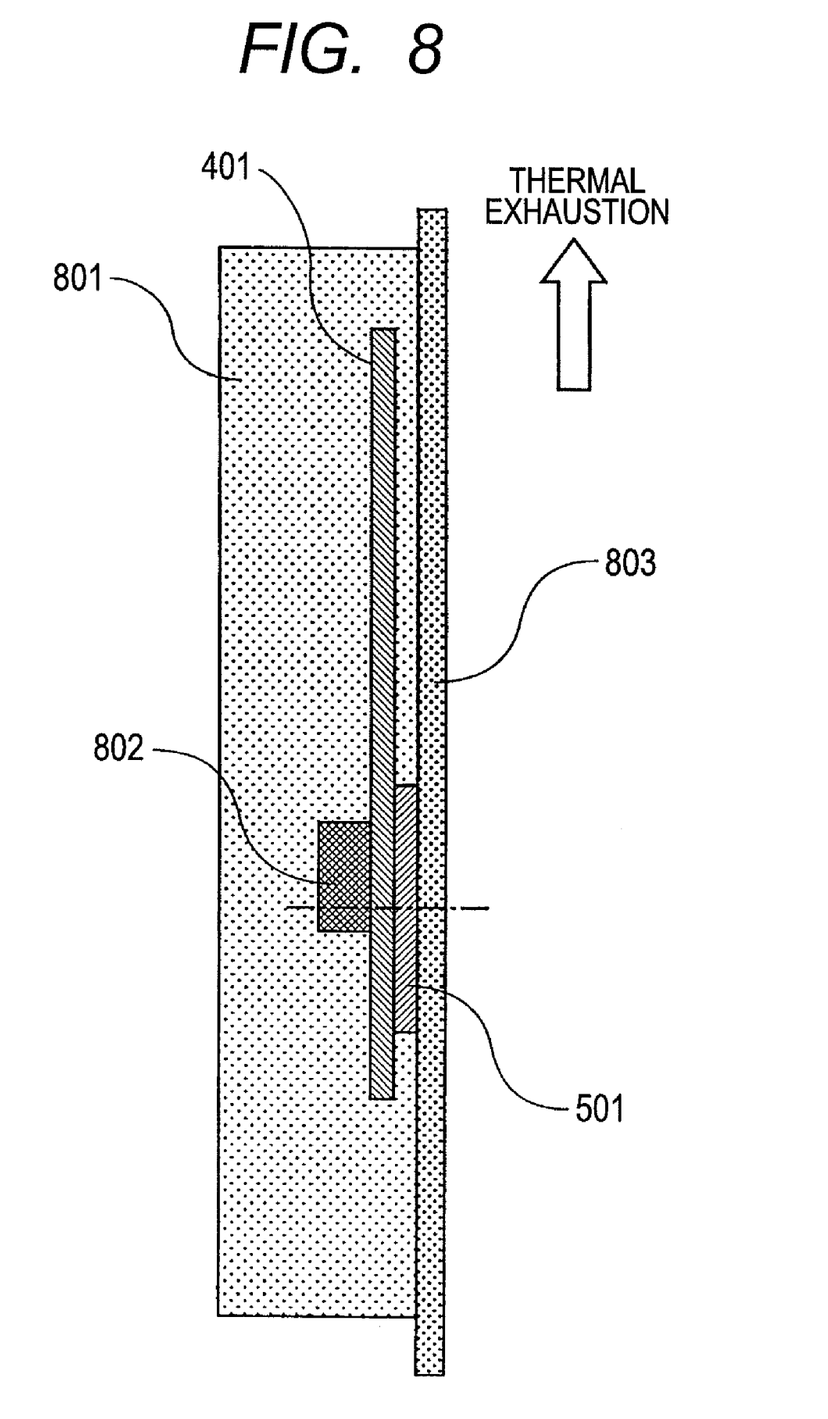
FIG. 8 is a diagram explaining measurement conditions when temperatures were actually measured on an experimental board, with respect to configuration of an example of the wiring board used in the liquid crystal display device according to an embodiment of the present invention.

Temperature analysis of the wiring board 401' for reference in FIG. 4B and the wiring board 401 according to the embodiment of the present invention in FIG. 4C will be described below with reference to FIGS. 5, 6, 7 and 8. FIG. 5 is a sectional view showing the portion of the wiring board 401' shown in FIG. 4B and another portion which extends continuously from the portion in FIG. 4B and on which the LED 502 is mounted. FIG. 5 also shows the thermally conductive sheet 501 which is not shown in FIG. 4B. FIG. 6 is a sectional view showing the portion of the wiring board 401 shown in FIG. 4C, the wiring board 401 being used in the liquid crystal display device according to the embodiment of the present invention. FIG. 6 also shows another portion of the wiring board 401 which extends continuously from the portion shown in FIG. 4C and on which the LED 502 is mounted, and shows the thermally conductive sheet 501 which is not shown in FIG. 4C. FIG. 7 is a diagram for explaining the results of temperature analysis based on desk calculation on a configuration of an example of the wiring board used in the liquid crystal display panel according to the embodiment of the present invention. FIG. 8 is a diagram for illustrating measurement conditions when temperatures were actually measured on an experimental board, with respect to configuration of an example of the wiring board of the liquid crystal display device according to the embodiment of the present invention.

In the wiring board 401' for reference shown in FIG. 5 and the wiring board 401 according to an example of the present invention shown in FIG. 6, the board material substrate 424 used has a thickness of 1.5 mm and made of a glass epoxy resin, the copper wiring pattern 422 used has a thickness of 90 μm to 100 μm, the resist 421 used has a film thickness of 100 μm, and the thermally conductive sheet 501 used has a thickness of 0.5 mm. The thermally conductive sheet 501 is a double-faced adhesive, one face adhering to the wiring board 401' or the 401 and the other face adhering to a metal plate such as an iron plate or the like (not shown).

In FIGS. 5 and 6, when, as conditions for desk calculation, the power Q of the LED 502 is 0.36 W (120 mA, 3V), the thermal-exhaustion pattern area A (per one LED) of the wiring board is 15 mm×20 mm, a contribution s of the thermal-exhaustion pattern size of the wiring board is 50%, the thickness of the resist 421 is 100 μm, and a thermal conductivity λ of the resist 421 is 0.2 W/m·K, a thermal resistance R and a temperature difference ΔT are calculated from equation (1) and equation (2).

$$R = (1/\lambda) \cdot (t/A/s) \qquad \text{Equation (1)}$$

$$\Delta T = R \cdot Q \qquad \text{Equation (2)}$$

As a result, a thermal resistance R=3.32(° C./W) and a temperature difference ΔT=1.2° C. as improvement effect were obtained.

As a result, for example, when areas of temperature differences are defined by the curve lines in FIG. 7 as rough boundaries, heat is conducted from area (1) through areas (2), (3), (4), (5), (6) to area (7). Accordingly, the heat generated by the LED is diffused and exhausted in the direction of the chassis 803. For example, assuming that the amounts of heat generation of both the LED electrode pads of the wiring boards 401, 401' are equally 0.32 W, temperature t1 in area (1) is approximately 93° C.≧t1>91.5° C., temperature t2 in area (2) is approximately 91.5° C.≧t2>91° C., temperature t3 in area (3) is approximately 91° C.≧t3>90° C., temperature t4 in area (4) is approximately 90° C.≧t4>88.5° C., temperature t5 in area (5) is approximately 88° C.≧t5>87° C., temperature t6 in area (6) is approximately 87° C.≧t6>86.5° C., and temperature t7 in area (7) is approximately 86.5° C.≧t7>86° C.

The resist exists between area (4) and area (5). A temperature difference is approximately 0.5° C. in the resist. By removing the resist, the thermal exhaustion property can be enhanced, and therefore the temperature of the wiring board can be reduced by 0.5° C.

Note that FIG. 7 does not show a temperature in the through-hole area. If it shows, it will be shown that the temperature of the through-hole area is higher than that of the surroundings from top to bottom (in the direction of the reverse side of the wiring board).

Next, temperatures were actually measured in the configuration shown in the sectional view in FIG. 8. In FIG. 8, a 3216 chip resistor (The unit of the '3216' is a mm.) 802 is mounted on the wiring board 401 as a heater generating heat as in the case of a LED instead of the LED. The chip resistor 802, the wiring board 401 and the thermal exhaustion sheet 501 are enclosed by a thermal insulator 801 such as polyurethane foam or the like in order to provide similar enclosing conditions to those in the backlight of the liquid crystal display device.

The reverse side of the wiring board 401 is thermally connected to the chassis 803 through the thermally conductive sheet 501 with the double-faced adhesive. Temperatures were measured in approximately the same conditions as those in FIG. 5 or FIG. 6, except for the chip resistor 802 used instead of the LED 502.

As a result, when the ambient temperature is 20.8° C. and the resist is 100 μm thick, in the wiring board 401' for reference, heat run test resulted in an increase in the ambient temperature to 30.1° C., causing a temperature rise of 9.3° C. As compared with this, in the wiring board 401 according to the embodiment of the present invention, heat run resulted in an increase in the ambient temperature to 27.5° C., causing a temperature rise of 6.7° C. That is, as compared with the wiring board for reference, in the wiring board according to the embodiment of the present invention, the resist on the reverse side opposite to the LED mounting surface is removed from a predetermined region around the LED, thereby successfully achieving a temperature rise that is 2.6° C. lower than the temperature rise measured in the wiring board for reference. From this, it is seen that the thermal exhaustion property, or the cooling efficiency, is improved.

According to the examples of the embodiment, it is possible to provide a liquid crystal display device with an enhanced thermal exhaustion property while allowing a reduction in thickness of the liquid crystal display device.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising a backlight including light sources to illuminate a liquid crystal panel from a rear side thereof, and a chassis to hold the backlight, the backlight comprising:
   a plurality of light-source units each including a combination of an LED that emits light in a direction parallel to a display surface of the liquid crystal panel, a wiring board on which the LED is mounted, and a light-guide plate having translucency for guiding the light of the LED toward the liquid crystal panel,
   a metal chassis supporting the light-source units, and
   a thermally conductive sheet making close contact with and inserted between the metal chassis and a reverse side of the wiring board opposite a face of the wiring board on which the LED is mounted, wherein a first wiring pattern is formed on the reverse side of the wiring board, wherein the metal chassis and a portion of the first wiring pattern located within a predetermined distance from the outer periphery of the LED are connected through the thermally conductive sheet to each other, and wherein the wiring board includes a board material substrate, a second wiring pattern formed on the face of the wiring board, such that the first and second wiring patterns are respectively disposed to both sides of the board material substrate, a resist to electrically insulate a predetermined area of each of the wiring patterns, and a through hole to electrically connect the first and second wiring patterns.

2. A liquid crystal display device comprising a backlight including light sources to illuminate a liquid crystal panel from a rear side thereof, and a chassis to hold the backlight, the backlight comprising:

a plurality of light-source units each including a combination of an LED that emits light in a direction parallel to a display surface of the liquid crystal panel, a wiring board on which the LED is mounted, and a light-guide plate having translucency for guiding the light of the LED toward the liquid crystal panel, a metal chassis supporting the light-source units, and a thermally conductive sheet making close contact with and inserted between the metal chassis and a reverse side of the wiring board opposite a face of the wiring board on which the LED is mounted, wherein a wiring pattern is formed on the reverse side of the wiring board, wherein the metal chassis and a portion of first wiring pattern located within a predetermined distance from the outer periphery of the LED are connected through the thermally conductive sheet to each other, and wherein the predetermined distance is 20 mm or less.

3. The liquid crystal display device according to claim 1, wherein solder is accumulated on the first wiring pattern on the reverse side of the wiring board, and the wiring board is attached closely to the metal chassis through a portion where the solder is accumulated and the thermally conductive sheet.

4. The liquid crystal display device according to claim 1, wherein a connector is placed on the reverse side of the wiring board for connection to another circuit board.

5. A liquid crystal display device comprising a backlight including light sources to illuminate a liquid crystal panel from a rear side thereof, and a chassis to hold the backlight, the backlight comprising:

a plurality of light-source units each including a combination of an LED that emits light in a direction parallel to a display surface of the liquid crystal panel, a wiring board on which the LED is mounted, and a light-guide plate having translucency for guiding the light of the LED toward the liquid crystal panel, a metal chassis supporting the light-source units, and a thermally conductive sheet making close contact with and inserted between the metal chassis and a reverse side of the wiring board opposite a face of the wiring board on which the LED is mounted, wherein a wiring pattern is formed on the reverse side of the wiring board, wherein the metal chassis and a portion of the wiring pattern located within a predetermined distance from the outer periphery of the LED are connected through the thermally conductive sheet to each other, and wherein the wiring board is provided in plural, the plural wiring boards being arranged in a plurality of rows or a plurality of columns in at least one of the horizontal direction and the vertical direction with respect to the display surface of the liquid crystal panel.

6. The liquid crystal display device according to claim 2, wherein solder is accumulated on the wiring pattern on the reverse side of the wiring board, and the wiring board is attached closely to the metal chassis through a portion where the solder is accumulated and the thermally conductive sheet.

7. The liquid crystal display device according to claim 2, wherein a connector is placed on the reverse side of the wiring board for connection to another circuit board.

8. The liquid crystal display device according to claim 5, wherein solder is accumulated on the wiring pattern on the reverse side of the wiring board, and the wiring board is attached closely to the metal chassis through a portion where the solder is accumulated and the thermally conductive sheet.

9. The liquid crystal display device according to claim 5, wherein a connector is placed on the reverse side of the wiring board for connection to another circuit board.

* * * * *